United States Patent [19]

Butzin et al.

[11] Patent Number: 5,112,566
[45] Date of Patent: May 12, 1992

[54] DEVICE FOR DIMENSIONALLY CHARACTERIZING ELONGATE COMPONENTS

[75] Inventors: Donald F. Butzin, Wilmington, N.C.; Edward W. Meeka, Pleasanton; George W. Tunnell, Foster City, both of Calif.; Edgar E. Salvo, Jr., Wilmington, N.C.

[73] Assignee: General Electric Company, San Jose, Calif.

[21] Appl. No.: 336,999

[22] Filed: Apr. 12, 1989

[51] Int. Cl.⁵ .................................. G21C 17/00
[52] U.S. Cl. .................. 376/245; 376/258; 376/259; 376/249; 376/248
[58] Field of Search ............ 376/245, 258, 259, 249, 376/248; 33/174; 73/866.5

[56] References Cited

U.S. PATENT DOCUMENTS 4,759,897 7/1988 Tolino .................. 376/245
4,766,374 8/1988 Glass, III ............. 376/249

Primary Examiner—Brooks H. Hunt
Assistant Examiner—Meena Chelliah
Attorney, Agent, or Firm—Robert R. Schroeder

[57] ABSTRACT

Disclosed is a device for measuring dimensional characteristics of an elongate component which comprises:

(a) an elongate rigid support that bears (i) an upper platform upon which is mounted a drive; (ii) a clamp mechanism for securing said component about its proximal end in a reference position; (iii) a lower platform which supports a pedestal for securing said component about its distal end in a reference position; and (b) a sensor carriage movably mounted to said rigid support and operatively connected to said drive for movement along the elongate extent of said support and having an opening penetrating therethrough for receiving said elongate component when it is secured by and substantially parallel to said rigid support, said carrier bearing a plurality of pivotally-mounted bell cranks spaced about said opening, each bell crank having a wheel for riding on said component during movement of the carrier and being in contact with a sensor capable of providing a signal correlative to displacement of the bell crank during movement of the carrier along the elongate component.

23 Claims, 12 Drawing Sheets

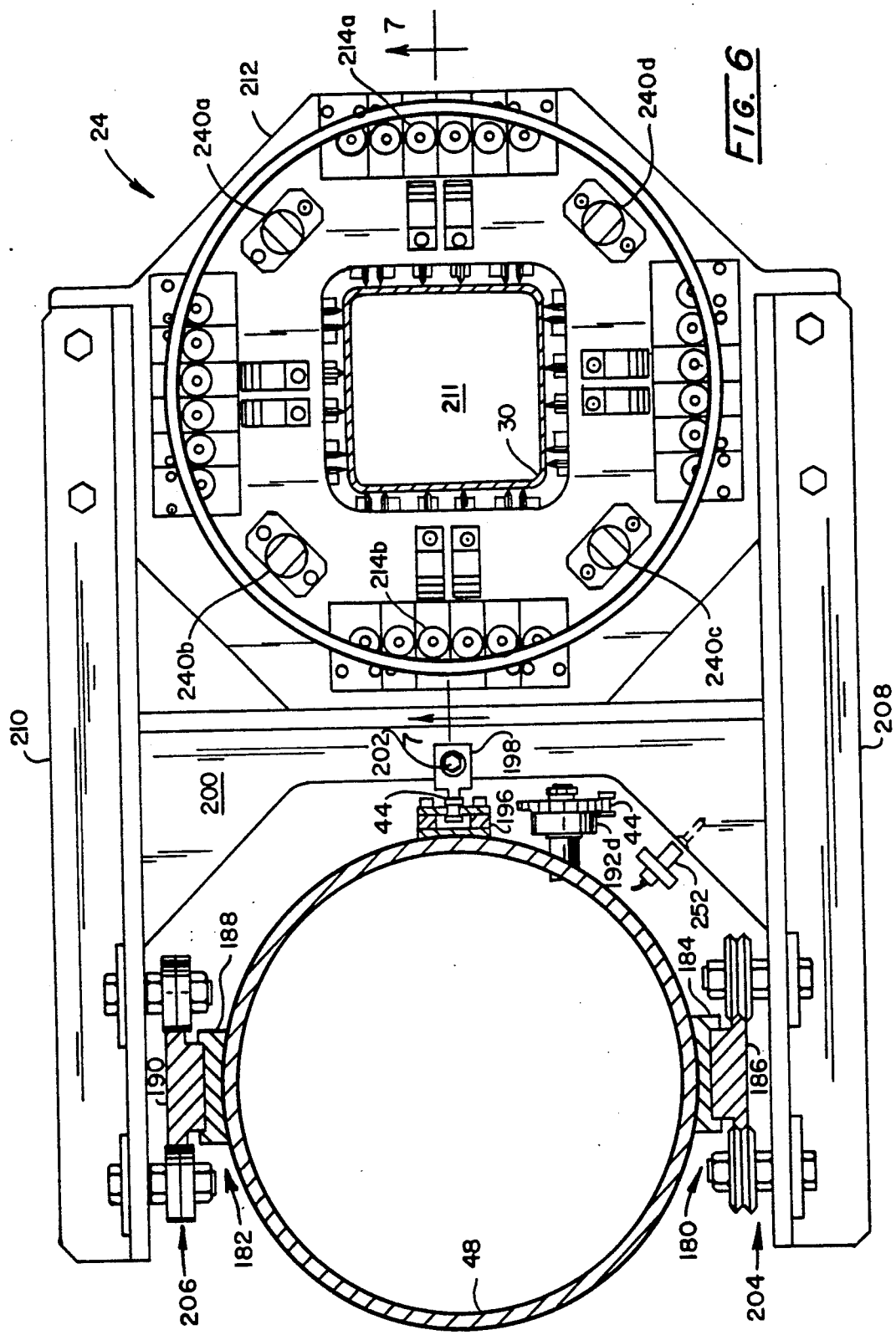

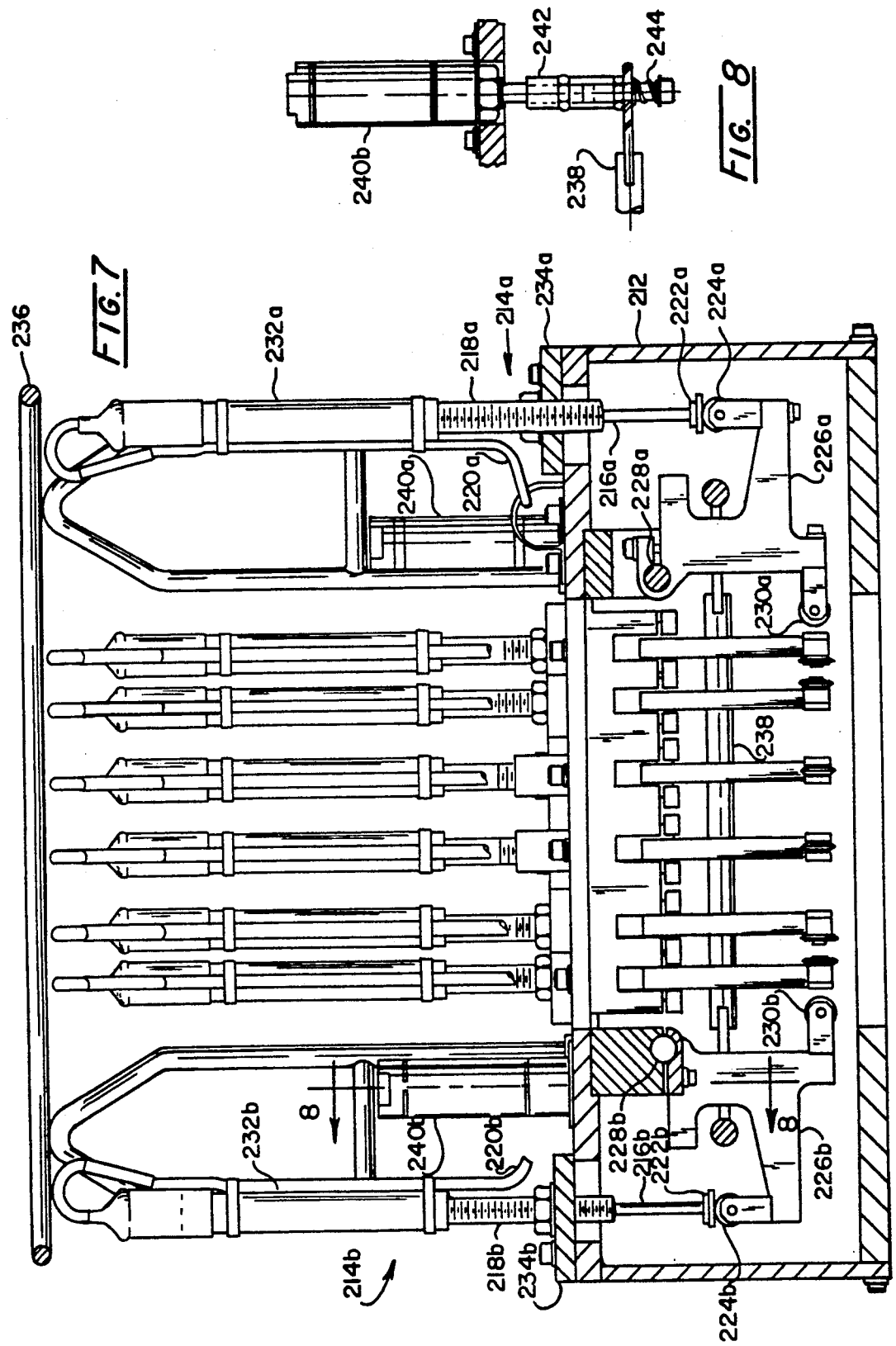

DEVICE FOR DIMENSIONALLY CHARACTERIZING ELONGATE COMPONENTS

BACKGROUND OF THE INVENTION

The present invention relates to measurement devices in general and more particularly to a device which utilizes articulated sensors for dimensionally characterizing elongate components.

There are numerous components in industrial and utility installations that require on-site inspection to verify continued serviceability. Such inspections may be required before the component is placed in service or it may be part of a maintenance program to ascertain whether the component can continue to be used. Component inspections frequently include dimensional measurements. A notable example, for present purposes, is the on-site inspection of components of a nuclear reactor, especially replaceable components such as control rods, fuel elements, and fuel channels.

For example, a typical fuel assembly having a removable and reusable flow channel is shown in U.S. Pat. No. 3,689,358. Such channel is an elongate square, tubular member often formed of a Zircaloy alloy. It is necessary to assure that the four major exterior surfaces of such channels are sufficiently flat so as to not interfere with the insertion of control rods between fuel assemblies during operation in the nuclear reactor core. Dimensions of interest include face bulge, channel width, non-squareness, longitudinal bow, and twist. Dimensional tolerances over the length of such channel may be on the order of about 0.127 mm.

Since channels and other reactor components which have been in service are radioactive, it is necessary that the measuring device be remotely operable under water to protect the equipment operator from exposure to radiation. Also, it is desirable that the measuring device be sufficiently portable for its repositioning within a water pool, for movement from one pool to another, and for removal to dry storage when not in use. Examples of prior art measuring devices can be found in U.S. Pat. Nos. 4,197,652 and 4,274,205.

BROAD STATEMENT OF THE INVENTION

One aspect of the present invention is a device for measuring dimensional characteristics of an elongate component which preferably is a nuclear reactor fuel channel. The device comprises an elongate rigid support that bears (i) an upper platform upon which is mounted a drive; (ii) a clamp mechanism for securing said component about its proximal at a reference position; and (iii) a lower platform which supports a pedestal for securing said component about its distal end in a reference position. Said device also has a sensor carriage movably mounted to said rigid support and operatively connected to said drive for movement along the elongate extent of said support and which has an opening penetrating therethrough for receiving said elongate component when it is secured by and substantially parallel to the rigid support.

The sensor carriage comprises another aspect of the present invention. The sensor carrier bears a plurality of pivotally-mounted bell cranks spaced about said opening. Each bell crank has a wheel for riding on said component during movement of the carrier and being in contact with a sensor capable of providing a signal correlative to displacement of the bell crank during movement of the carrier along the elongate component. Preferred sensors comprise linear variable differential transformers that are mounted substantially parallel with the component and rigid support.

As another aspect of the present invention there is a grapple assembly provided for securing the component for its placement in the device and removal from the device. The grapple assembly includes a grapple body and an actuator shaft secured thereto. Preferably, the actuator shaft is secured both at the upper platform and just above the grapple body. The grapple body and pedestal both desirably contain spring-biased bearing block assemblies that press on the inner walls of the elongate component for placing it in a reference position.

Advantages of the present invention include a device that is portable and easily set-up at remote locations for providing dimensional characterization of elongate components, especially nuclear reactor fuel channels. Another advantage is a device that readily is mounted under water and easily operable by an operator remotely distanced therefrom. Other advantages include a unique grapple assembly for moving the elongate component and for securing it to the device. Further advantages include a unique carrier assembly which permits all exterior sides of the elongate component to be dimensionally characterized simultaneously. Yet another advantage are unique centering mechanisms that precisely and reproducably locate the elongate component in a position within the device. These and other advantages will be readily apparent to those skilled in the art based upon the disclosure contained herein.

BRIEF DESCRIPTION OF THE DRAWINGS

FIG. 6 is a section taken along line 5—5 of FIG. 5;

FIG. 7 is a section taken along line 6—6 of FIG. 6;

FIG. 8 is a section taken along line 7—7 of FIG. 7;

The drawings will be described in detail in connection with the following description.

DETAILED DESCRIPTION OF THE INVENTION

Figure 1:
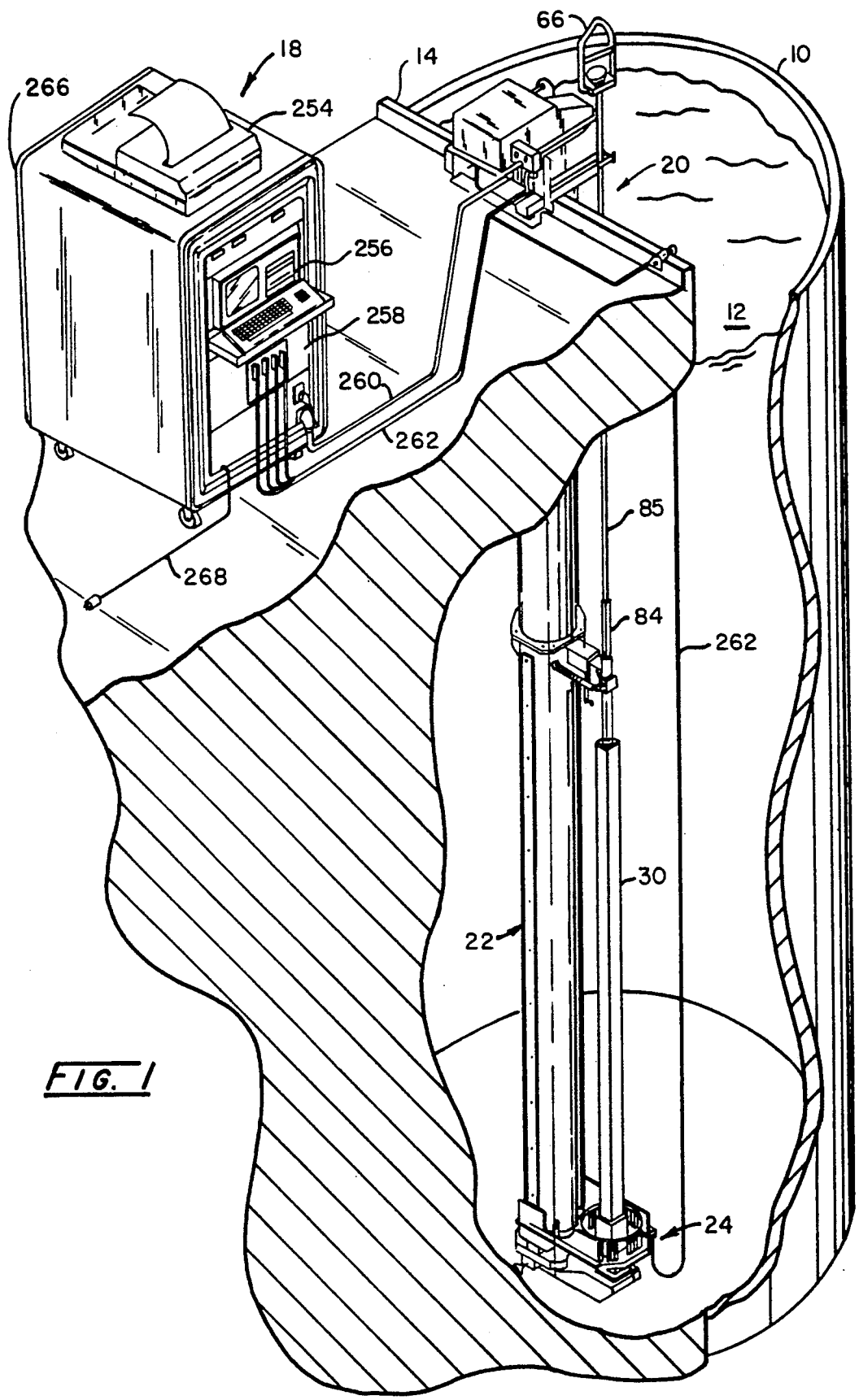
FIG. 1 is a perspective, cut-away view of a water pool in which the inventive device is shown in operable configuration for dimensionally characterizing a nuclear reactor fuel channel.

Referring initially to FIG. 1, the inventive device is seen in its operable state within pool 10 that is filled with water 12. The device is affixed to pool 10 at curb 14 about its upper end and laterally against wall 16 (see FIG. 4). The predominant components of the inventive device can be seen in FIG. 1 to include instrument package 18 (which will be described in detail later herein), upper strongback section and drive system 20 (see FIG. 2), lower strongback section and rail assembly 22 (see FIG. 3), and carriage assembly 24 (see FIG. 3). The remaining features of the device depicted at FIG. 1 will become apparent from the description that follows.

Figure 2:
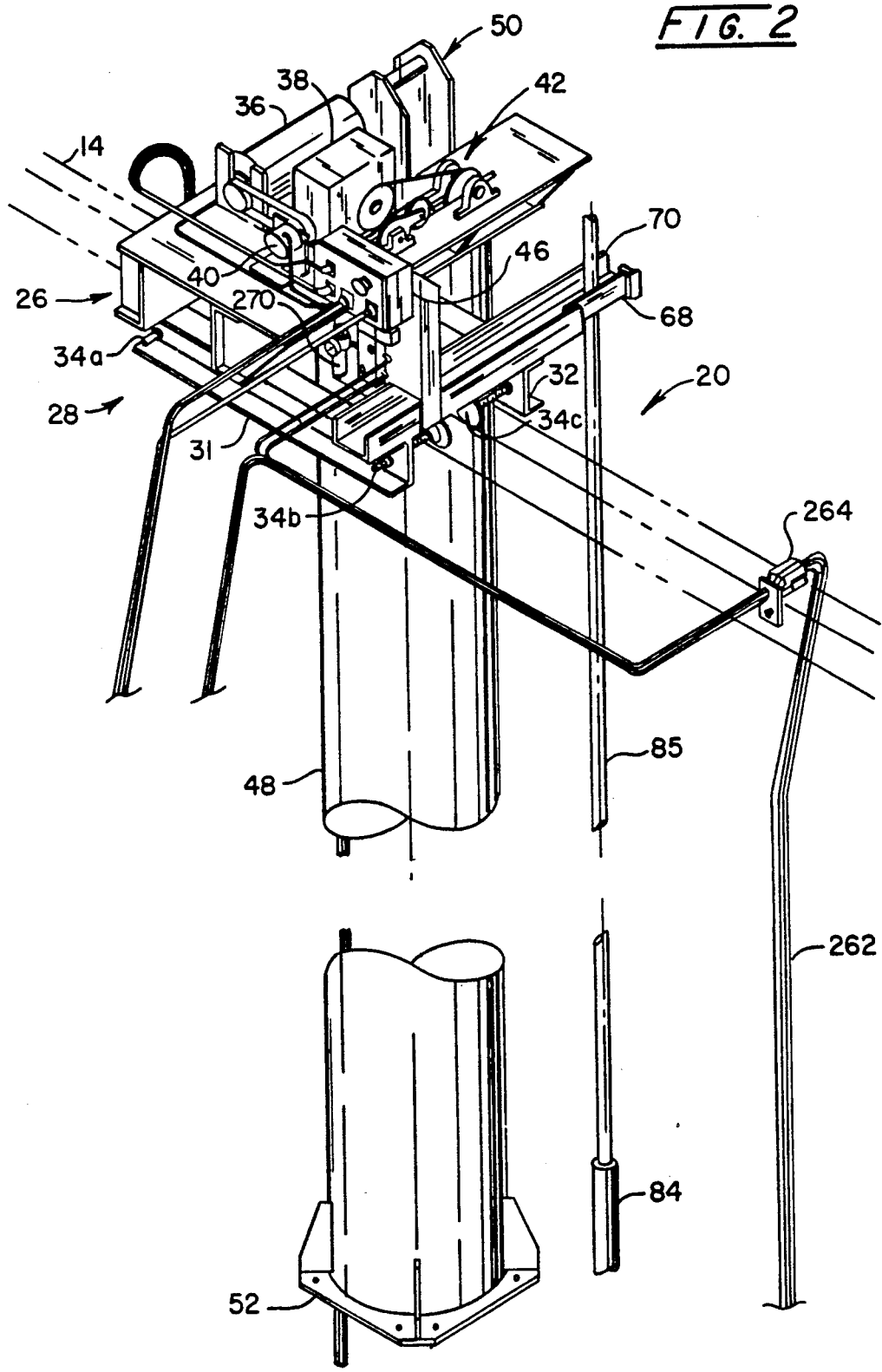
FIG. 2 is a perspective, elevational view showing the upper section of the inventive device with the pool curb shown in phantom.

Referring to upper strongback section and drive system 20, reference will be made to FIGS. 1, 2, and 4. Initially, it will be observed that platform 26 is attached to curb 14 of pool 10 by clamp assembly 28 which includes channels 31 and 32 through which threaded swivel pad assemblies 34a-d pass to provide clamping against curb 14. Upper platform 26 additionally contains the drive mechanism for driving carriage assembly 24. Motor 36 is seen to be coupled to gear reducer 38 to which is attached optical encoder 40. Motor 36 desirably is a stepper motor and optical encoder 40 enables the operator to determine the extent of movement of carriage assembly 24 during use of the inventive device. Take-up and idler assembly 42 connect gear reducer 38 to carriage assembly 24 via chain 44 (see FIG. 5). Junction box 46 is the last major element on upper platform 26 and provides for centralized connection to instrument package 18 (as will be described in detail later herein).

Connected to upper platform 26 is pipe 48, which in the preferred use of the inventive device in the dimensional characterization of nuclear reactor fuel channels, has an outside diameter of about 12 inches and a wall thickness of one-quarter inch. Pipe 48 is open at both ends so that water fills the interior thereof when the assembly is placed within water 12 of pool 10. About the upper end of pipe 48 can be seen lift assembly 50 which is designed for connection to a crane, for example, for lifting the inventive device into and out of water 12 of pool 10. It should be observed that pipe 48 in the present design is fabricated in two sections which are attached at flanges 52 and 54 (see FIG. 3). Such arrangement enhances the portability of the device by enabling pipe 48 to be disassembled for more compact storage and transport thereof.

Referring now to lower strongback section and rail assembly 22, reference in particular will be made to FIGS. 2 and 3. The lower section of pipe 48 assists in aligning pipe 48, and thus the inventive device, in the desirable vertical orientation utilizing threaded swivel pad assembly 56 which is carried by lower platform 58 and which is in contact with wall 16 (see FIG. 5). Lower platform 58 also is fitted with shock absorbers 60a and 60b (60b not visible in the drawings) for carriage assembly 24.

Next, the component to be measured and its attachment to the inventive device will be described with particular reference to FIGS. 1-4. Initially, it will be observed that grapple assembly 62 is connected to fuel channel 30 about its upper end. Grapple assembly 62, in turn, is connected to alignment sleeve 84 which is connected to grapple shaft 85 which is fitted with grapple handle 66 about its upper end. Such combination permits the transport of fuel channel 30 from a fuel storage pool, for example, to be placed within the inventive device for dimensional characterization. Grapple shaft 85 is retained at upper platform 26 by retainer bar 68 which is connected by tie channel 70 to upper platform 26. Retaining bar 68 is pivotally connected to tie channel 70 at the end closest to curb 14 for retaining grapple shaft 85.

Alignment sleeve 84, just above grapple assembly 62, is secured to the lower section of pipe 48 by grapple clamp 72 which retains alignment sleeve 84 in the V recess contained at the outer projection of grapple rest 74. Grapple rest 74, in turn, is secured to pipe 48. Alignment sleeve 84 has a machined outer surface for precise position alignment with the V recess of grapple rest 74. Grapple clamp 72 is pivotally connected to slide block 76 which, in turn, is connected to spring holder 78 which, in turn, is pivotally connected to clamp arm 80, which is connected to pipe 48 as depicted at FIG. 3. Spring 82 encircles spring holder 78 and is biased against slide block 76 for closing grapple clamp 72 against grapple rest 74.

Figure 4A:
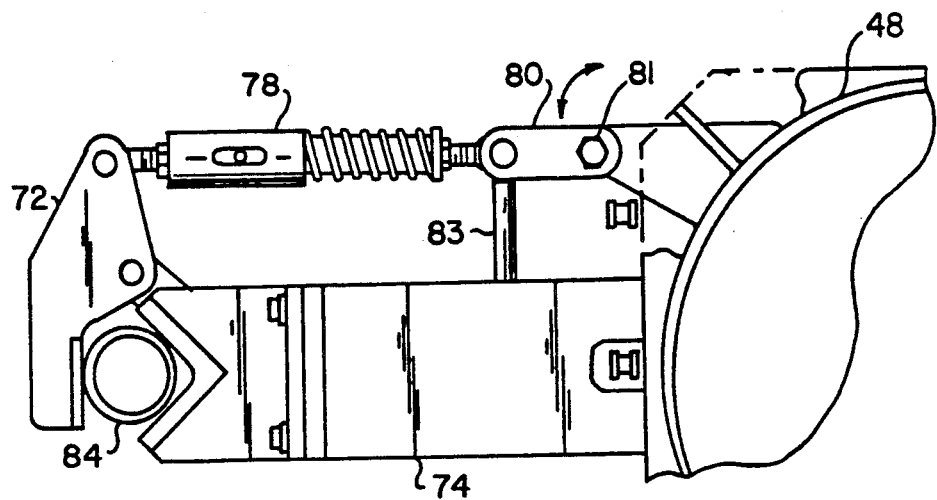
FIGS. 4A and 4B are overhead views of the grapple clamp assembly in closed and open positions.
Figure 4B:
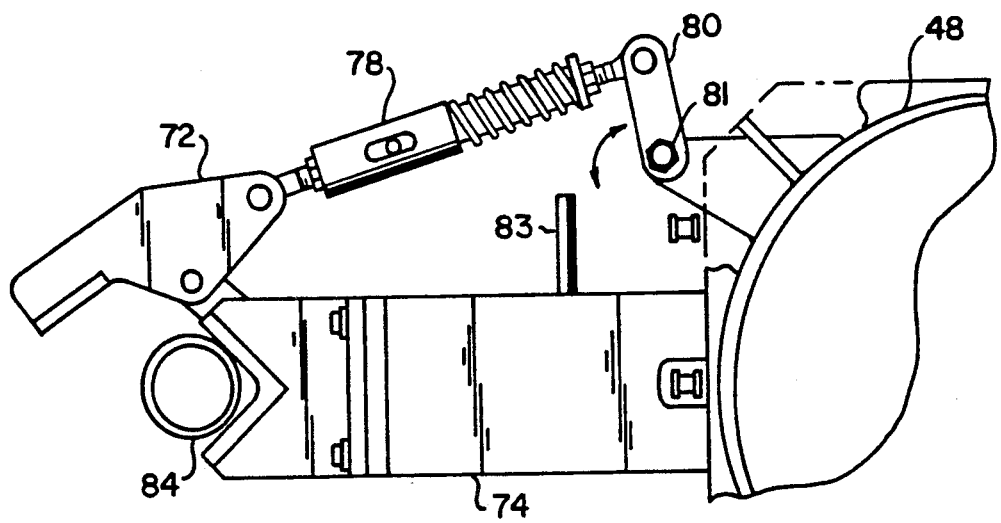
Figure 5:
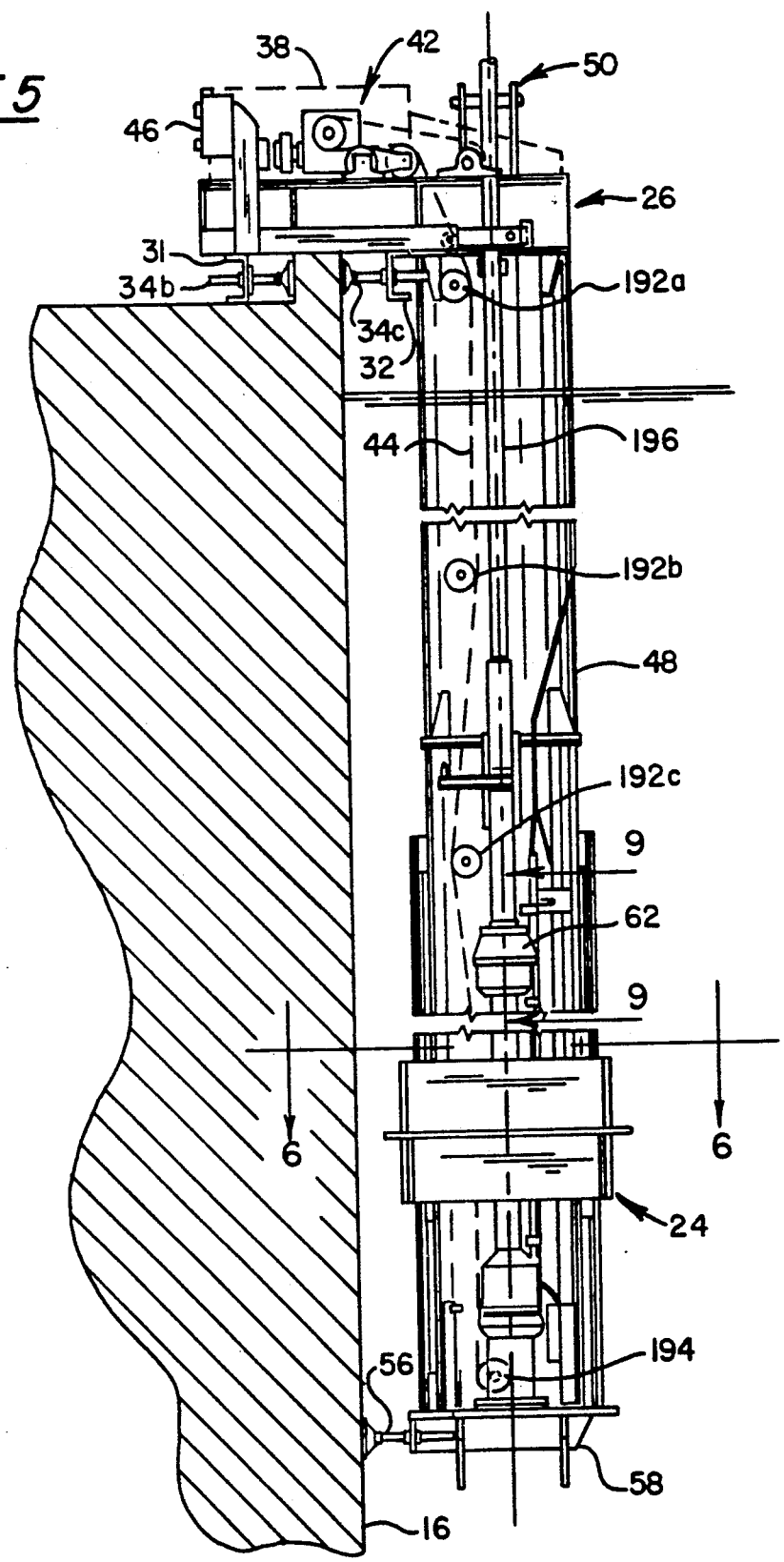
FIG. 5 is a side-elevational view of the inventive device in operable configuration as set forth at FIG. 1.

Referring to FIG. 4, grapple clamp 72 is manually actuated to retain alignment sleeve 84 in the V recess of grapple rest 74 by a, for example, ⅜ inch socket tool (not shown in the drawings) with a suitable extension (e.g. 6 feet when the inventive device is used to dimensionally characterize nuclear fuel channels) on hexagonal head actuator 81 (⅜ inch when a ⅜ inch socket tool is used) at the pivot point of clamp arm 80. The operator turns hexagonal head 81 counterclockwise to release alignment sleeve 84 and clockwise to clamp alignment sleeve 84 tight in the V recess of grapple rest 74. Alignment shaft 83 prevents pivot clamp arm 80 attached to spring holder 78 from extending beyond slightly over-center, thus assuring that alignment sleeve 84 is clamped tight and will be held in place when unattended.

Figure 9:
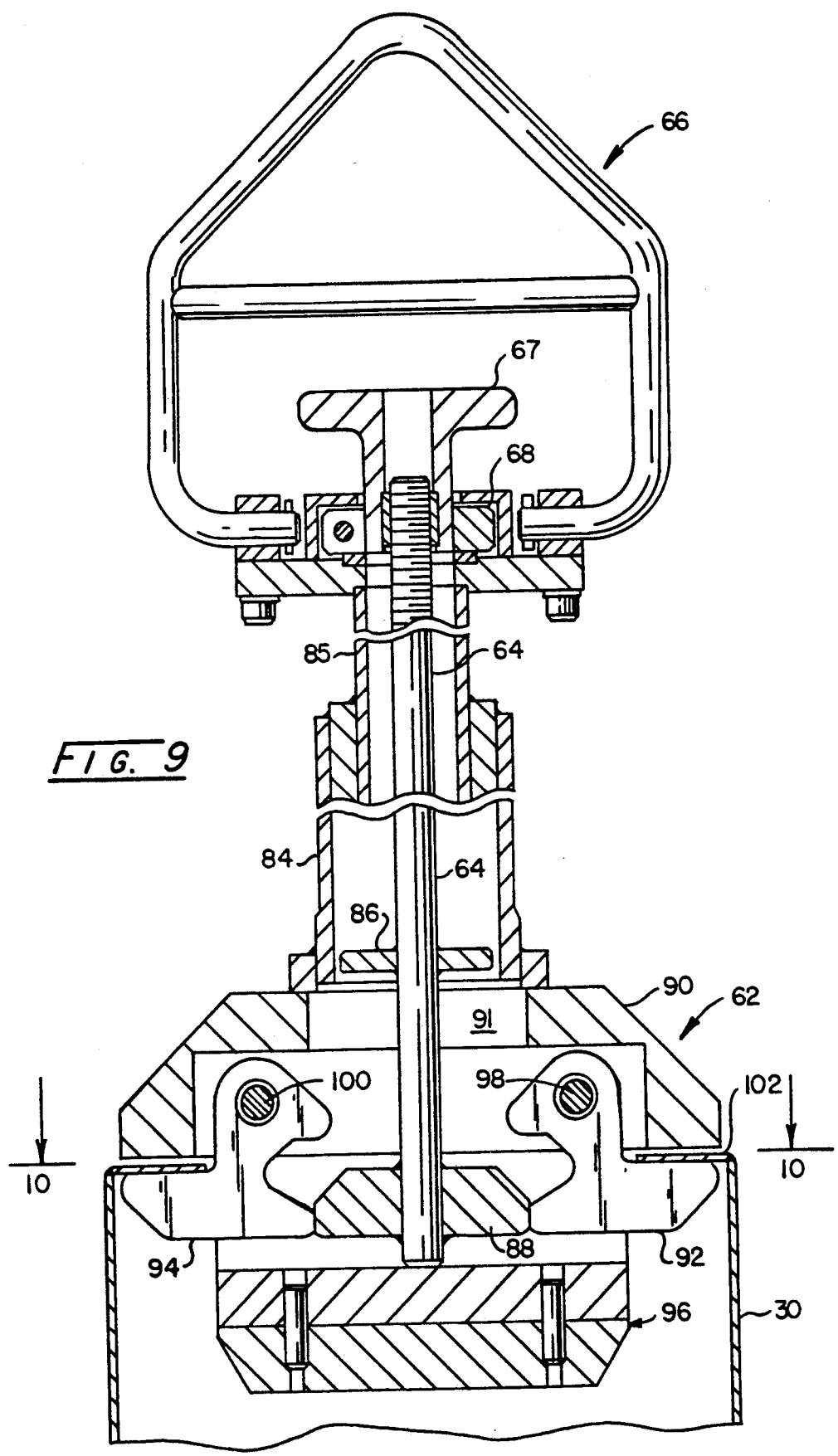
FIG. 9 is a section taken along line 8—8 of FIG. 5.

Referring to FIG. 9, it will be observed that actuator shaft 64 is inserted into grapple shaft 85 and into alignment sleeve 84 of grapple assembly 62. Actuator shaft 64 has flanges 86 and 88 about its lower end. Flange 88 is inserted into grapple body 90 through an aperture therein which rotates dogs 92 and 94 to a closed position indicated by the end of actuator shaft 64 contacting end plate assembly 96. Dogs 92 and 94 pivot about shafts 98 and 100, respectively. Bearings are provided about shafts 98 and 100 in conventional fashion. When dogs 92 and 94 are in place and secure against flange 88, it will be observed that they engage lip 102 about the upper or proximal end of fuel channel 30 which is retained about its upper side by the lower end of grapple body 90.

Actuator shaft 64 is moved up and down actuating dogs 92 and 94 by turning threaded knob 67. Actuator shaft 64 will not rotate due to flange 88 fitting into slot 91 in grapple body 90. Actuator shaft 64 moves up and down as threaded knob 67 is turned, as collet 68 prevents such movement by knob 67.

Figure 10:
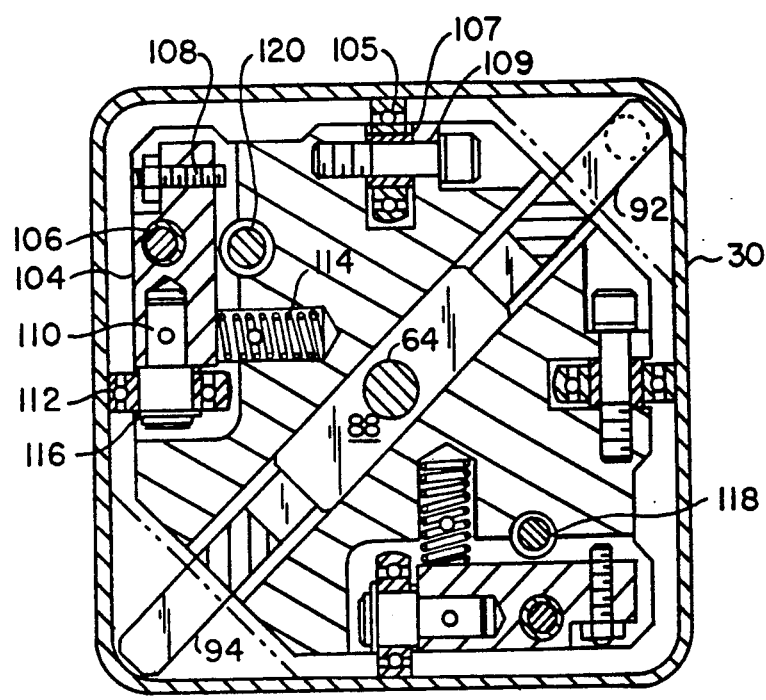
FIG. 10 is a section taken along line 9—9 of FIG. 9.

Since fuel channel 30 must be precisely located in a predetermined reference position for its dimensional characterization, grapple assembly 62 is fitted with an alignment mechanism which can be seen by referring to FIG. 10. There are two types of alignment mechanisms in grapple assembly 62. There are two fixed alignment mechanisms, identical in construction and two spring-loaded alignment mechanisms identical in construction. For ease of labeling, various parts of the two alignment mechanisms will be used in the following detailed description. The fixed alignment mechanisms consist of bearing 105 which is pressed into sleeve 107 which is held in a fixed position in grapple tool 62 by cap screw 109. Bearing 105 rotates in sleeve 107.

The spring-loaded alignment mechanisms operate as follows. Bearing block 104 pivots about shaft 106 and its position is adjusted by set screw 108. Housed within bearing block 104 is roll pin 110 which retains bearing 112 about its free end. Bearing 112 is free to rotate about roll pin 110 and presses against the inner wall of channel 30 by the action of spring 114. Retaining ring 116 secures bearing 112 to roll pin 110. Appropriate spacers are used on either side of bearing 112 in conventional fashion. End plate assembly 96 is secured to grapple body 90 by bolts 118 and 120. It will be observed that the four biased assemblies locate channel 30 in a predetermined reference position about its upper end.

Figures 11, 12, 13:
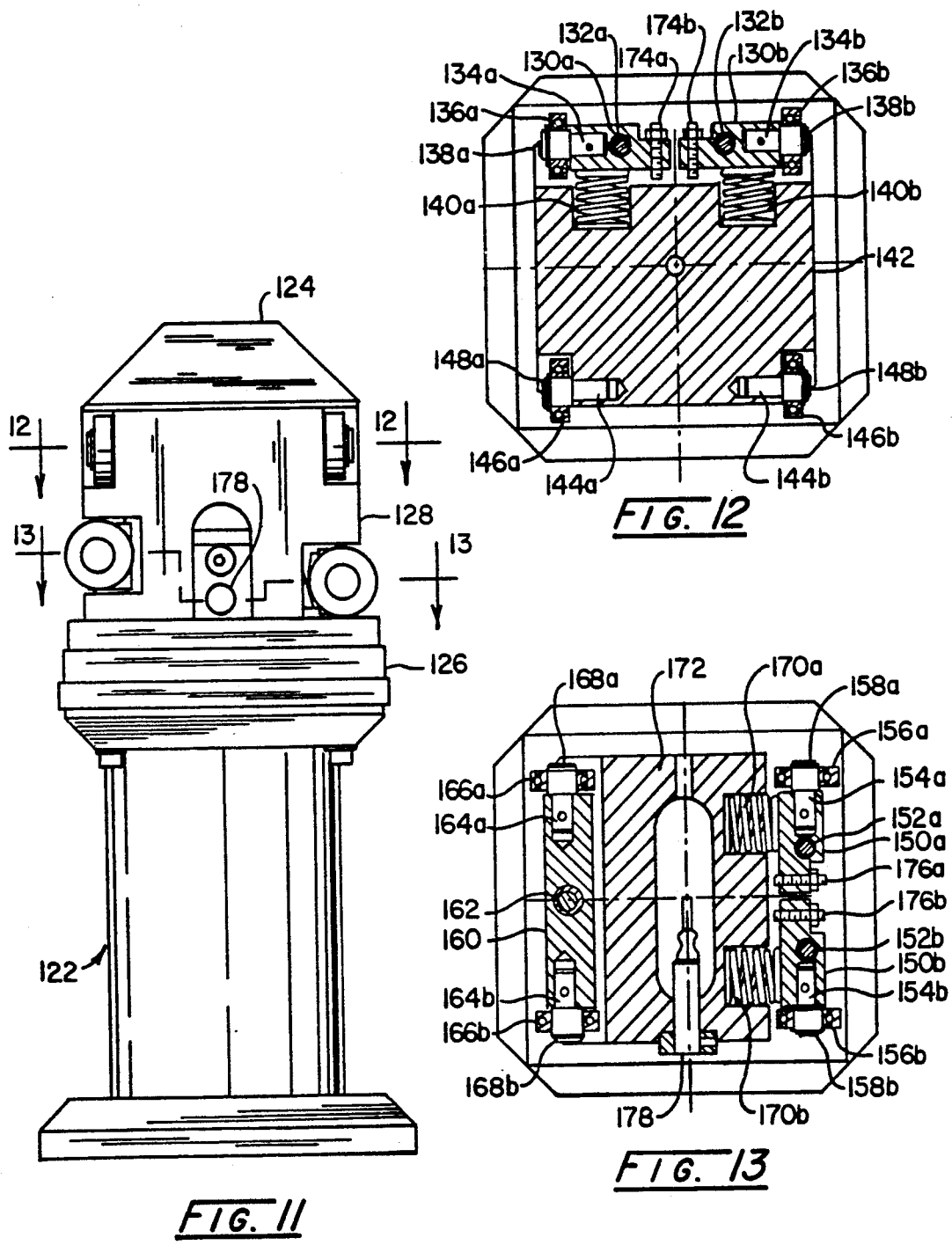
FIG. 11 is a side-elevational view of the pedestal upon which the channel rests during operation of the inventive device.
FIG. 12 is a section taken along line 11—11 of FIG. 11.
FIG. 13 is a section taken along line 12—12 of FIG. 11.

With respect to securing channel 30 at its lower end, reference is made to FIGS. 11-13. Pedestal 122 is secured to lower platform 58 and is surmounted by tapered cap 124 which is adapted to receive the lower or distal end of fuel channel 30. The distal end of fuel channel 30 rests atop sensor standard 126. Within housing 128 is disposed an alignment mechanism similar in construction to that mechanism housed within grapple assembly 62 and described in detail in connection with FIG. 10. It will be observed, however, that four pairs of rollers are provided at two different vertical elevations with each set of four rollers adapted to abutt two oppositely-disposed interior faces of fuel channel 30 each. Referring to FIG. 12, it will be observed that bearing blocks 130a and 130b rotate about shafts 132a and 132b, respectively. Shafts 132a and 132b are conventionally provided with bearing sleeves. Housed within bearing blocks 130a and 130b, respectively, are roll pins 134a and 134b. About the free ends of roll pins 134a and 134b are bearings 136a and 136b which are retained by retaining rings 138a and 138b. It will be observed that bearings 136a and 136b rotate about roll pins 134a and 134b and are pressed against one side of fuel channel 30 by springs 140a and 140b which are housed within plate 142. Oppositely disposed within plate 142 are roll pins 144a and 144b which retain about their free ends bearings 146a and 146b which are secured by retaining rings 148a and 148b. Bearings 146a and 146b are adapted to confront and rotate against the opposite interior surface of fuel channel 30, thus providing a reference position in one direction of fuel channel 30.

In order to provide a reference position for the distal end of fuel channel 30 in the opposite direction, reference is made to FIG. 13 where it will be observed that bearing blocks 150a and 150b rotate about shafts 152a and 152b and are provided with sleeve bearings in conventional fashion. Roll pins 154a and 154b are housed within bearing blocks 150a and 150b and about their free ends is located bearings 156a and 156b which are secured in position by retaining rings 158a and 158b. Again, bearings 156a and 156b confront one interior surface of fuel channel 30 while the oppositely-disposed interior surface is confronted by a similar assembly affixed to bearing block 160 which is retained by shaft 162. Disposed within bearing block 162 are roll pin 164a and 164b, which about their free ends retain bearings 166a and 166b which are secured in position by retaining rings 168a and 168b. It will be observed that bearings 166a and 166b are stationary while bearings 156a and 156b confront the interior surface of fuel channel 30 by the action of springs 170a and 170b that are housed within plate 172. It will be observed that bearing blocks 130a and 130b have provision for fine adjustment by set screws 174a and 174b and bearing blocks 150a and 150b can be adjusted by set screws 176a and 176b. Thus, the distal end of fuel channel 30 can be placed in a reference position for its dimensional characterization. It should be observed with reference to FIG. 13 that proximity sensor 178 senses the presence of a fuel channel in position on pedestal 122.

Figure 3:
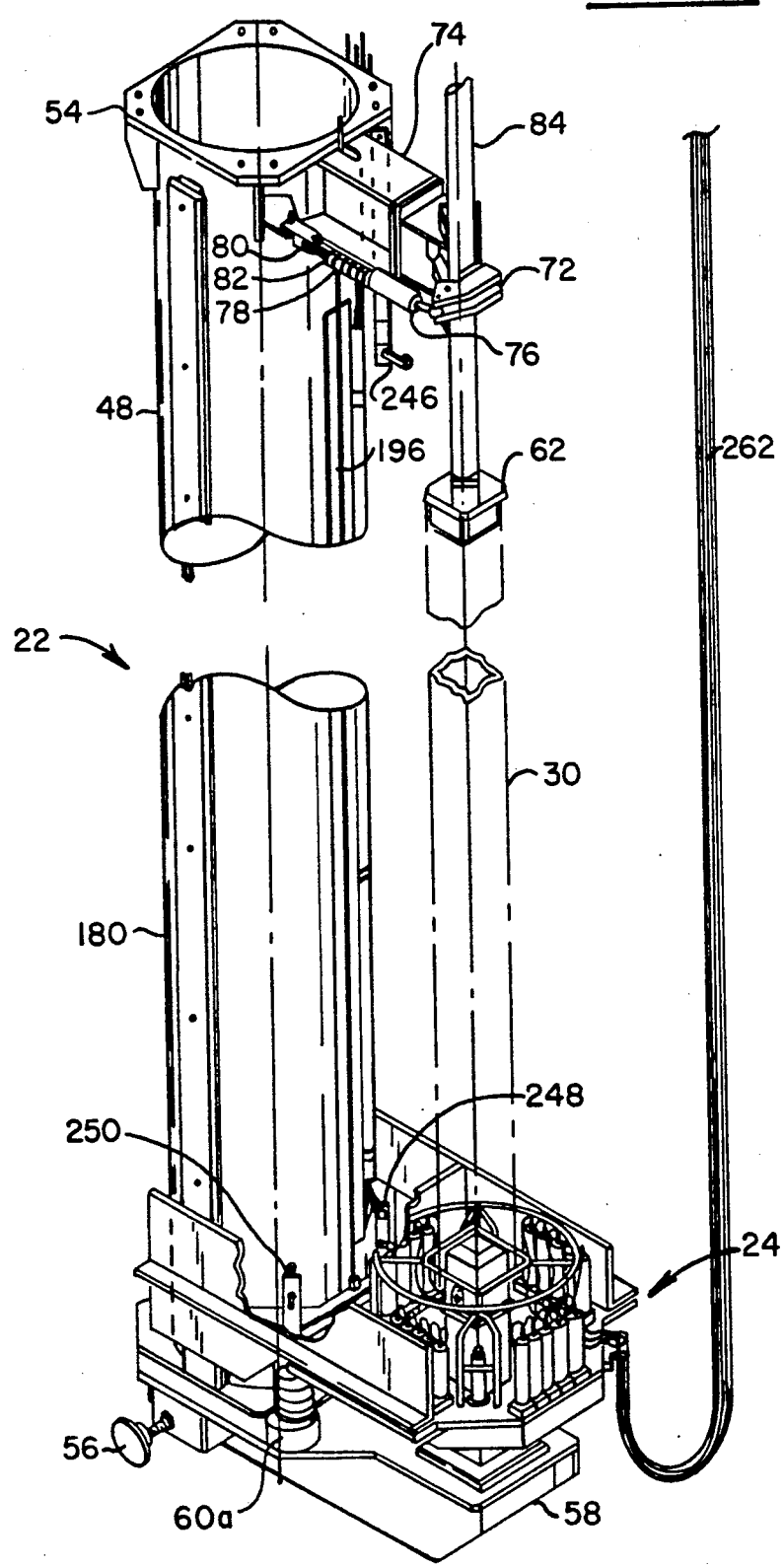
FIG. 3 is a perspective, elevational view of the lower section of the inventive device, FIGS. 2 and 3 together showing the in-pool portion of the device entirely.

With reference to carriage assembly 24, a review of FIG. 3 will reveal that carriage 24 is adapted for vertical movement along the longitudinal extent of pipe 48 in such a manner so as to simultaneously traverse the longitudinal extent of fuel channel 30 from its distal end to its proximal end and in such a manner enabling the dimensional characterization of all sides of fuel channel 30 simultaneously, a feature setting the present device apart from the art. Carriage assembly 24 is mounted to pipe 48 by rail assemblies 180 (FIG. 3) and 182 (see FIG. 6). Rail assembly 180 is composed of mounting bar 184 and rail 186 (FIG. 6). Rail assembly 182 is formed of mounting bar 188 mounted to pipe 48 and rail 190 affixed thereto. Drive from motor 36 is provided to carriage assembly 24 via chain 44 that winds between various idler sprockets, e.g. sprockets 192a, 192b, and 192c, for example (see FIG. 5), thence to return sprocket 194 and thence through chain guide 196 which returns the chain to take-up and idler assembly 42 about upper platform 26. With reference to FIG. 6, it will be observed that chain 44 and chain guide 196 is affixed via plate 198 to cross beam 200 that forms a portion of carriage assembly 24. Bolt 202 secures chain mounting plate 198 to cross-beam 200. In such fashion, drive chain 44 provides movement of carriage assembly 24 along the longitudinal extant of pipe 48 substantially the length of rail assemblies 180 and 182. Referring still to FIG. 6, it will be observed that roller assembly 204 with notched wheels provides secure attachment to rail 186. Roller assembly 206 with its flat wheels rides along rail 190 in following fashion as rail assembly 204 provides the reference location of carriage assembly 24 with respect to pipe 48. Idler sprocket 192 is exemplified in its attachment to pipe 48. Side beams 208 and 210 sandwich cross-beam 200 and provide an attachment location for roller assemblies 204 and 206 which are bolted thereon in conventional fashion. Sensor mounting plate 212 similarly is seen to be bolted to side beams 208 and 210. It will be observed that hole 211 penetrates sensor mounting plate 212 and is of the same configuration as the external circumference of fuel channel 30. It will be appreciated that hole or aperture 211 in sensor mounting plate 212 could be of different configuration mirroring the external circumference or fingerprint of the component to be dimensionally configured by the device of the present invention.

While the number of sensors used to dimensionally configure each side of fuel channel 30 is variable, six sensors for each of the four sides of fuel channel 30 are depicted at FIGS. 6 and 7, though such number could be greater or lesser as is necessary, desirable, or convenient. In order not to clutter FIG. 6 to the point of obfuscating the invention, the description of the sensors for the device illustrated in the drawings will be described with particularity by reference to sensors 214a and 214b set forth at FIG. 7, although it will be appreciated that all 24 sensors set forth in the drawings are identical in construction. Sensors 214a and 214b are illustrated in the drawings as linear variable differential transformers (LVDT). Briefly, an LVDT comprises linearly movable spring-loaded plungers 216a and 216b extending from housings 232a and 232b. Movement of plungers 216a and 216b changes the mutual inductance of a pair of coils disposed within housings 218a and 218b. Thus, the mutual inductance of the pair of coils can be measured and interpreted as a function of the linear position of plungers 216a and 216b. A signal representing the mutual inductance of the pair of coils is carried by lines 220a and 220b, as will be more fully described later herein. Nose pieces 222a and 222b are fitted at the outer end of plugers 216a and 216b and are in contact with rollers 224a and 224b. These rollers are secured to bell cranks 226a and 226b, each of which are pivotally mounted to flex pivots 228a and 228b. Rollers 230a and 230b are affixed to each bell crank and are adapted to tactilely confront and ride along the outer surface of fuel channel 30 for its dimensional characterization. Utilizing a roller minimizes the opportunity for any mars or defects in the component being dimensionally characterized from placing an undue strain on the sensor and damaging it. Bell cranks 226a and 226b are biased against fuel channel 30 by springs contained in spring housings 232a and 232b. Sensor clamps 234a and 234b attach the LVDTs to sensor mounting plate 212 which, it will be observed, is fabricated in the form of a case in which the bell cranks are housed. Bail and guard ring assembly 236 similarly is attached to sensor mounting plate 212 and protects the LVDTs from damage. It will be observed that the use of the bell cranks enables the LVDT sensors to be disposed in an upright or vertical state. Since the LVDT sensors have substantial length, mounting them vertically enables a much smaller carriage assembly to be fabricated than, for example, the arrangement depicted in U.S. Pat. No. 4,274,205 which utilizes such LVDT sensors in horizontal disposition with the nosepieces directly riding on the fuel channel.

When it is desired to move the bell cranks away from the fuel channel, reset bar 238 is activated by air cylinders 240a, 240b, 240c, and 240d. With reference to FIG. 8, it will be observed that shaft 242 is biasedly connected to reset bar 238 utilizing spring 244. Activating air cylinders 240 causes reset bar 238 to move upwardly, thus causing the bell canks to pivot outwardly and away from the component being dimensionally characterized. In order to ensure that carriage assembly 24 does not exceed its intended path, over-travel switches 246 and 248 (see FIG. 3) are provided. Proximity switch 250 (FIG. 3) is a "home" switch that provides a datum for carriage assembly 24. Proximity switch 250 is tripped by sensor actuator 252 mounted to cross beam 200 (FIG. 6b).

In operation, a fuel channel is removed from the fuel bundle which is placed in storage. The grapple/alignment tool composed of grapple assembly 62, actuator shaft 64, and grapple handle 66 are attached to channel 30 making sure that the channel is in the requisite orientation. Fuel channel 30 then is transferred to the dimensional characterization device of the present invention in the requisite orientation and clamped in place with retaining bar 68 and grapple clamp 72. Channel 30 now is in place for measurement.

Instrument package 18 (FIG. 1) is seen to include printer 254, computer 256, and signal conditioner 258 to which cable assemblies 260 and 262 run. Cable assembly 262 runs to junction box 46 while cable assembly 262 of data cables runs through data cable strain relief mechanism 264 and thence down to a similar mechanism affixed to carriage assembly 24. Power for the instruments located within wheeled instrument container 266 can be accessed via power cord 268. Again, a modular arrangement for portability and ease of transportability is seen to be provided.

Figure 14A:
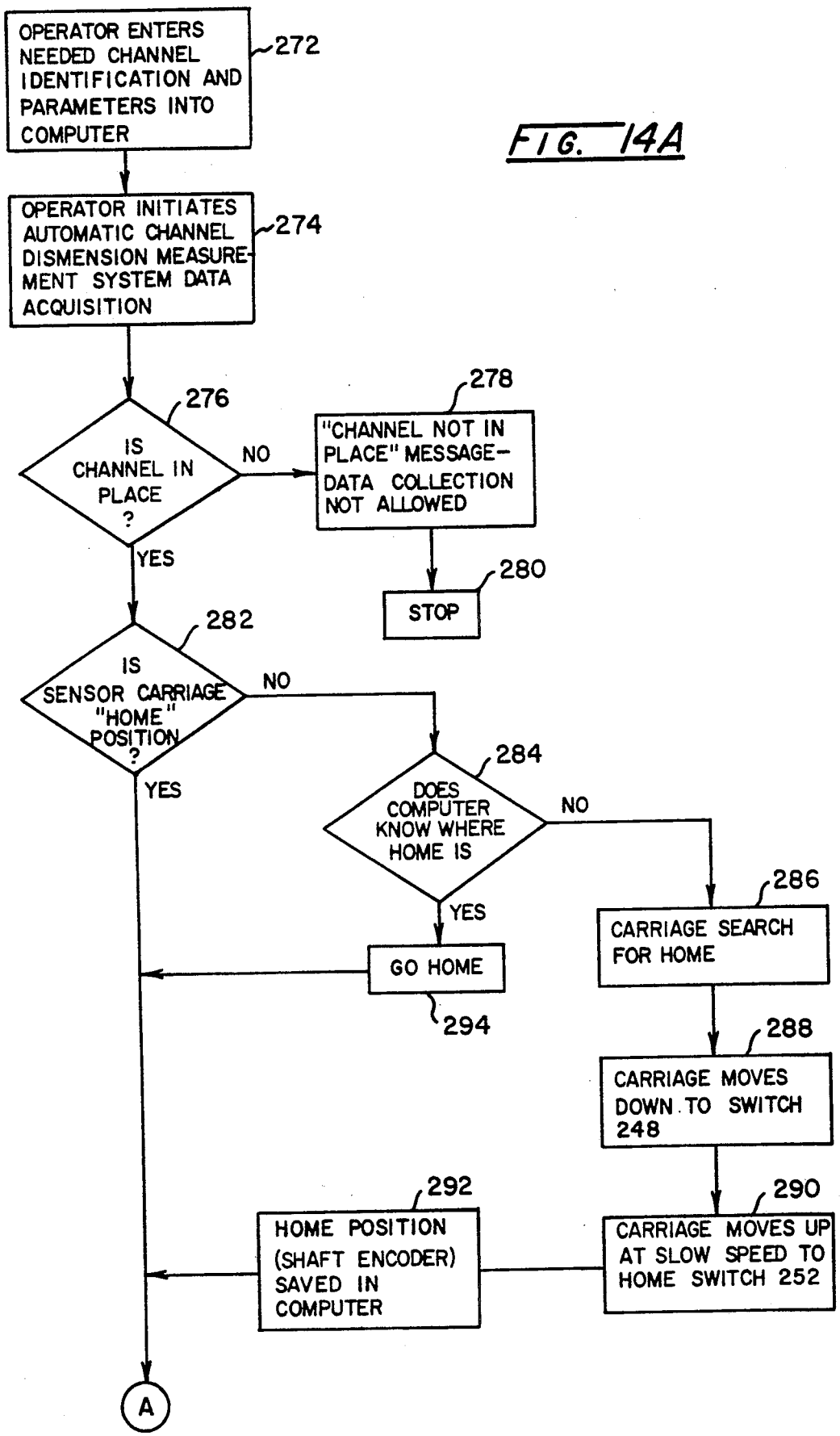
FIG. 14 is a flow diagram of the computer program that is used in conjuction with a computer that preferably is used along with the inventive device.
Figure 14B:
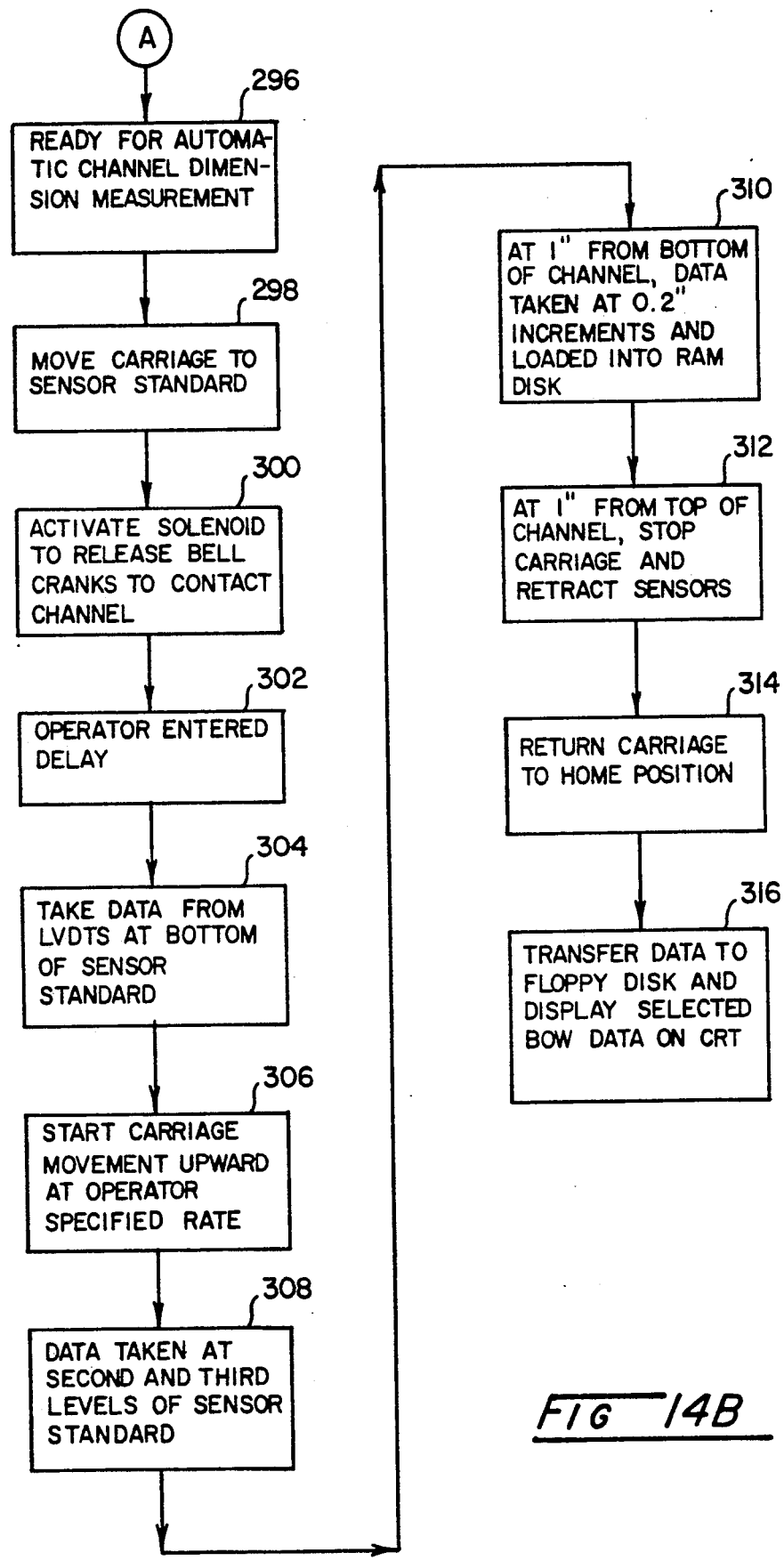

Now that the channel is ready for dimensional characterization, the operator enters the needed channel identification information and parameters into computer 256 as at block 272 in FIG. 14. Such parameters include the delay in activation of carriage 24 after initiation of authorization to engage the bell crank assemblies with channel 30, the carriage movement rate (e.g. 2.5 inches per second or other value). Thereafter, the operator initiates the automatic channel dimension measurement system data acquisition program stored within computer 256. The following sequence of events are monitored and/or controlled by the computer program.

Initially, the program encounters function 276 wherein the computer looks for a signal from proximity sensor 178 indicative that the channel is in place and properly located within the fixture. If the "channel not in place" message appears on the screen as indicated in block 278, data collection is not allowed and the program is terminated as indicated at block 280. The operator then needs to remove channel 30 and start the sequence again by re-mounting it within the fixture. If the computer properly senses that the channel is in place, the program continues to block 282 wherein the computer next looks to see whether home switch 252 has been activated by proximity switch 250, indicating that the carriage is at the requisite "home" position. If the "home" position is not sensed, then the program ascertains at block 284 whether the computer has information sufficient that it knows where the "home" position is. If the answer is in the negative, then carriage movement is activated as in block 286 by energizing motor 36 with the carriage movement being in the downward direction until it reaches over-limit switch 248 as at block 288 and then movement of the carriage is directed slowly upwardly per the instruction at block 290 until proximity switch 250 is tripped by sensor actuator 252. This home position then is saved in the computer at instruction 292 by correlating optical encoder 40. In this condition or where the computer already knows where home is as at block 294, the program at step 296 then activates automatic channel dimension measurement sequencing.

Initially, the program at 298 calls for the carriage to move to a position at sensor standard 126 at which time it stops. Solenoid 270 (FIG. 2) then causes the activation of air cylinders 240 which via reset bar 238 lowers bell cranks 226 into contact with sensor standard 126 according to instruction 300. The operator entered delay at step 272 then is encountered in the program at block 302. This time period of up to 30 seconds ensures that all bell cranks have been sufficiently released and are firmly resting against sensor standard 126. A set of data at 304 then is taken from the LVDTs of the bottom of the three sensor standards. Thereafter, carriage upward movement is commenced at step 306 at the operator specified rate entered at 272. With the carriage moving, data is taken at the second and third levels of sensor standard 126 according to block 308. All of the LVDTs now are calibrated at three different positions by virtue of sensor standard 126. Commencing at one inch from the bottom of fuel channel 30, data is taken at 2.51 mm (0.1 inch) increments substantially the entire longitudinal extent of fuel channel 30 per the instruction at block 310.

Data collection is ceased at approximately one inch from the top of channel 30 per the instruction at block 312. Carriage elevation is determined by optical encoder 40 affixed to the drive system, as described above. When data collection terminates, all bell crank assemblies also are retracted from fuel channel 30 via reset bar 238. Per the instruction at block 314, the carriage then returns to the "home" position, e.g. at a rate of 7.5 inches per second. When the carriage reaches the "home" position, the program at step 316 specifies that the data automatically is transferred from RAM disk, where it was recorded during data collection, to a floppy disk housed within computer 256 for providing a permanent record of the dimensional characterization of fuel channel 30. Selected channel bow data also is displayed graphically on the CRT screen for operator verification of the dimensional characterization of fuel channel 30. Channel measurement having been completed, grapple clamp 72 and retaining bar 68 are released so that the channel can be transferred to storage.

As to materials of construction, preferably all components are manufactured from stainless steel in order to provide a maximum degree of corrosion protection and for providing dimensional stability of all elements.

It will be appreciated that various of the components shown and described herein may be altered or varied in accordance with conventional wisdom in the field and certainly are included within the present invention provided that such variations do not materially vary from the spirit and precepts of the present invention as described herein.

I claim:

1. A movable carriage for use in a device for measuring dimensional characteristics of an elongate component, said device including a rigid support which is adapted to bear said movable carriage and to retain said component in a predetermined fixed orientation, which comprises:
a sensor carrier movably mounted to said rigid support and having an opening penetrating therethrough for receiving said elongate component, said carrier bearing a plurality of pivotally-mounted bell cranks spaced about said opening, each said bell crank having a wheel for riding on said component during movement of the carrier and being in contact with a sensor capable of providing a signal correlative to displacement of said bell crank during movement of the carrier along the elongate component.

2. The movable carriage of claim 1 wherein said rigid support bears rails and said carriage has wheels that ride upon said rails.

3. The movable carriage of claim 1 wherein said device has a motor connected to a drive chain that engages said carriage for its movement.

4. The movable carriage of claim 1 wherein said bell cranks retract from contact with said component.

5. The movable carriage of claim 4 wherein an air cylinder assembly is connected to a reset bar which reset bar is actuable for pivoting said bell cranks for their retraction.

6. The movable carriage of claim 1 wherein said sensors comprise linear variable differential transformers that are mounted vertically and substantially parallel with said elongate component to be dimensionally characterized.

7. The movable carriage of claim 6 wherein said linear variable differential transformer sensors are in contact with biasing means to cause the wheels of said bell cranks to press against said component when said component is retained by said device for its dimensional characterization.

8. A device for measuring dimensional characteristics of an elongate component which comprises:
(a) an elongate rigid support that bears (i) an upper platform upon which is mounted a drive; (ii) a clamp mechanism for securing said component about its proximal end in a reference position; (iii) a lower platform which supports a pedestal for securing said component about its distal end in a reference position; and
(b) a sensor carriage movably mounted to said rigid support and operatively connected to said drive for movement along the elongate extent of said support and having an opening penetrating therethrough for receiving said elongate component when it is secured by and substantially parallel to said rigid support, said carrier bearing a plurality of pivotally-mounted bell cranks spaced about said opening, each bell crank having a wheel for riding on said component during movement of the carrier and being in contact with a sensor capable of providing a signal correlative to displacement of the bell crank during movement of the carrier along the elongate component.

9. The device of claim 8 wherein said drive is an electric motor operatively connected to said carriage by a chain.

10. The device of claim 8 wherein a grapple assembly, which includes a grapple body connected to an alignment sleeve connected to a grapple shaft, is attached to said component for moving said component into a position for said device to secure it, said device clamp mechanism securing said alignment sleeve of said grapple assembly.

11. The device of claim 10 wherein said grapple shaft extends to a position adjacent said upper platform where a retainer bar secures said grapple shaft thereto.

12. The device of claim 10 wherein an actuator shaft is housed within said alignment sleeve and said grapple shaft, said component has a flange at its proximal end, and said actuator shaft has a flange about its end which is inserted into said grapple body, said grapple body retaining dogs that engage said actuator shaft flange for securing said actuator shaft, an opening being formed between said grapple body and said dogs for insertion of said component flange whereby said grapple assembly secures said component.

13. The device of claim 10 wherein said component is hollow about its proximal end and said grapple body retains a plurality of spring biased bearing block assemblies located below said dogs and which press against the inside walls of said component to place it in a reference position about its proximal end.

14. The device of claim 10 wherein said component is hollow at its distal end and said pedestal retains a plurality of spring biased bearing block assemblies which press against the inside walls of said component to place it in a reference position about its distal end.

15. The device of claim 13 wherein said component is hollow at its distal end and said pedestal retains a plurality of spring biased bearing block assemblies which press against the inside walls of said component to place it in a reference position about its distal end.

16. The device of claim 8 wherein said carriage bears a sensor switch and said rigid support bears a home switch above said lower platform and located such that said carriage sensor switch engages said rigid support home switch when said carriage is moved to a position above said lower platform and to a position wherein said pedestal penetrates through the hole in said carriage.

17. The device of claim 16 wherein said pedestal has a sensor standard location for calibrating said sensors on said carriage.

18. The device of claim 17 wherein said rigid support bears rails and said carriage has wheels that ride upon said rails.

19. The device of claim 18 wherein said bell cranks retract from contact with said component.

20. The device of claim 19 wherein an air cylinder assembly is connected to a reset bar which reset bar is actuable for pivoting said bell cranks for their retraction.

21. The device of claim 20 wherein said sensors comprise linear variable differential transformers that are mounted vertically and substantially parallel with said elongate component to be dimensionally characterized.

22. The device of claim 21 wherein said linear variable differential transformer sensors are in contact with biasing means to cause the wheels of said bell cranks to press against said component when said component is retained by said device for its dimensional characterization.

23. The device of claim 8 adpated for use when submerged under water in a curbed pool wherein said upper platform retains clamps that clamp said device onto the curb of said pool and said lower assembly has a support that presses against the pool wall for vertically orienting said device.

* * * * *